(12) United States Patent
Tsubota et al.

(10) Patent No.: US 10,083,513 B2
(45) Date of Patent: Sep. 25, 2018

(54) INFORMATION PRESENTATION DEVICE, STEREO CAMERA SYSTEM, AND INFORMATION PRESENTATION METHOD

(71) Applicant: PANASONIC INTELLECTUAL PROPERTY MANAGEMENT CO., LTD., Osaka (JP)

(72) Inventors: Kazuhiro Tsubota, Fukuoka (JP); Kenya Uomori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 185 days.

(21) Appl. No.: 15/095,251

(22) Filed: Apr. 11, 2016

(65) Prior Publication Data

US 2016/0225158 A1 Aug. 4, 2016

Related U.S. Application Data

(63) Continuation-in-part of application No. PCT/JP2015/002524, filed on May 20, 2015.

(30) Foreign Application Priority Data

May 28, 2014 (JP) ................................. 2014-110227

(51) Int. Cl.
*G06K 9/00* (2006.01)
*G06T 7/00* (2017.01)
(Continued)

(52) U.S. Cl.
CPC .......... *G06T 7/0075* (2013.01); *G06K 9/4671* (2013.01); *G06K 9/78* (2013.01);
(Continued)

(58) Field of Classification Search
None
See application file for complete search history.

(56) References Cited

U.S. PATENT DOCUMENTS

2011/0026773 A1 2/2011 Sumitomo et al.

FOREIGN PATENT DOCUMENTS

| JP | 07-218251 | 8/1995 |
| JP | 09-237341 | 9/1997 |

(Continued)

OTHER PUBLICATIONS

International Search Report in PCT/JP2015/002524, dated Aug. 18, 2015.

*Primary Examiner* — Sumati Lefkowitz
*Assistant Examiner* — David Perlman
(74) *Attorney, Agent, or Firm* — Greenblum & Bernstein, P.L.C.

(57) ABSTRACT

The information presentation device has an image acquisition unit, a parameter deriving unit, an abnormality detection unit, and the presentation unit. The image acquisition unit acquires a first image which is captured by a first imaging device and a second image which is captured by a second imaging device. The parameter deriving unit derives parameters for deriving three-dimensional coordinates from the first image and the second image. The abnormality detection unit determines presence or absence of an abnormality in a relative positional relationship or a relative relationship of pose between the first imaging device and the second imaging device according to the derived parameters. In a case where an abnormality is determined, the presentation unit presents warning information including an instruction that there is an abnormality.

11 Claims, 13 Drawing Sheets

(51) Int. Cl.
*H04N 13/246* (2018.01)
*G06K 9/46* (2006.01)
*G06K 9/78* (2006.01)
*G06T 7/80* (2017.01)
*H04N 13/204* (2018.01)

(52) U.S. Cl.
CPC ............ *G06T 7/85* (2017.01); *H04N 13/204* (2018.05); *H04N 13/246* (2018.05); *G06T 2207/10021* (2013.01); *G06T 2207/10028* (2013.01); *G06T 2207/30244* (2013.01)

(56) References Cited

FOREIGN PATENT DOCUMENTS

| | | |
|---|---|---|
| JP | 2003-329439 | 11/2003 |
| JP | 2007-033087 | 2/2007 |
| JP | 2007-037011 | 2/2007 |
| JP | 2011-028605 | 2/2011 |

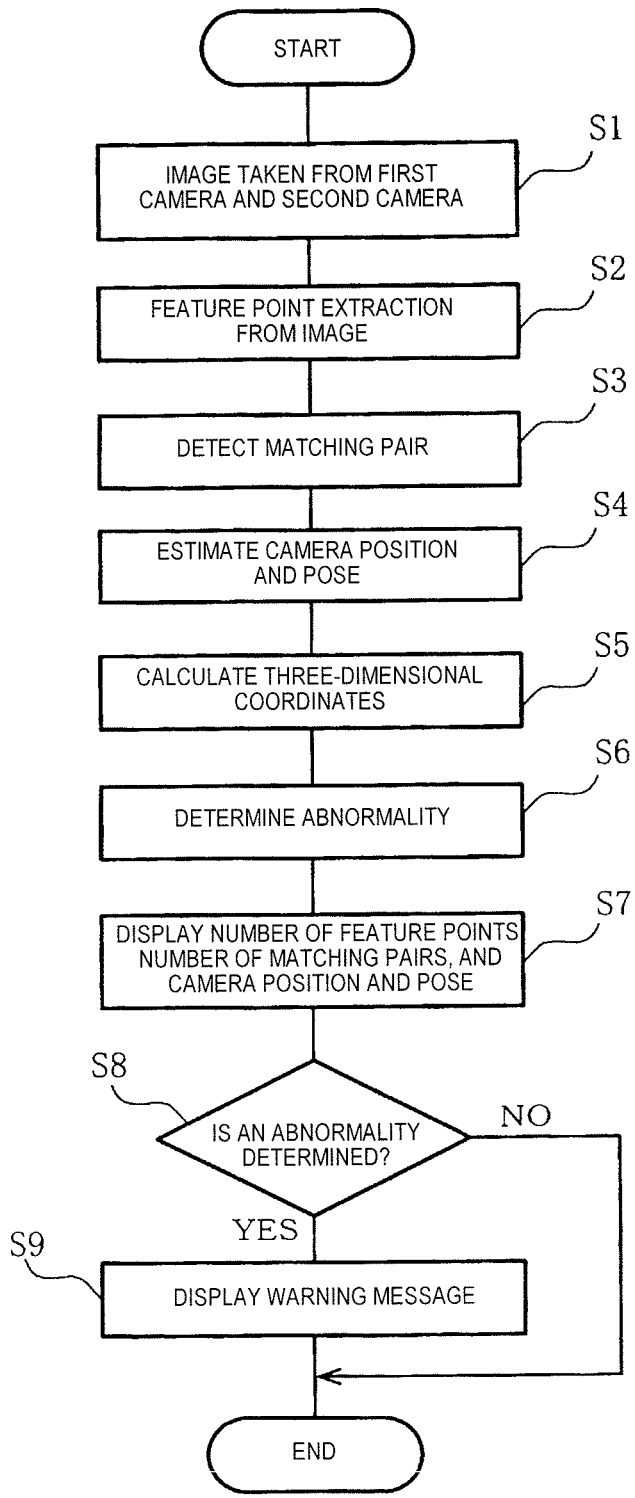

INFORMATION PRESENTATION DEVICE, STEREO CAMERA SYSTEM, AND INFORMATION PRESENTATION METHOD

RELATED APPLICATIONS

This application is a Continuation-in-Part of International Application No. PCT/JP2015/002524, filed May 20, 2015, which claims the benefit of Japanese patent application No. 2014-110227, filed May 28, 2014, the disclosures of which are incorporated by reference herein in their entireties.

BACKGROUND

1. Technical Field

The present disclosure relates to an information presentation device, a stereo camera system, and an information presentation method.

2. Description of the Related Art

A stereo camera is known in which two imaging units are fixed in one chassis such that the same subject is captured by the left and right imaging units. The stereo camera images the subject from a plurality of different directions, and information on the planar direction and information on a depth direction (three-dimensional position information) is recorded.

As a device which recovers three-dimensional position information, for example, in Japanese Patent Unexamined Publication No. 09-237341, a three-dimensional position information recovery device is known which has an image input unit, a matching pair detector, a essential matrix calculator, a translation calculator, a rotation calculator, and a distance calculator. The image input unit inputs two images which capture a three-dimensional rigid body. The matching pair detector detects a matching pair between two images. The essential matrix calculator calculates an essential matrix from a three-dimensional rotation matrix and a three-dimensional translation vector between the two images. The translation calculator calculates the three-dimensional translation vector. The rotation calculator calculates the three-dimensional rotation matrix. The distance calculator calculates a distance between the matching pair and a camera in a three-dimensional space.

SUMMARY

The present disclosure provides an information presentation device, a stereo camera system, and an information presentation method in which it is possible to easily recognize a calibration abnormality of an imaging device.

An information presentation device of the present disclosure has an image acquisition unit, a parameter deriving unit, an abnormality detection unit, and a presentation unit. The image acquisition unit acquires a first image which is captured by a first imaging device and a second image which is captured by a second imaging device. The parameter deriving unit sequentially derives parameters for deriving three-dimensional coordinates from the first image and the second image. The abnormality detection unit determines presence or absence of an abnormality in a relative positional relationship or a relative relationship of pose between the first imaging device and the second imaging device according to the sequentially derived parameters. The presentation unit presents warning information including an instruction that there is an abnormality in a case where the abnormality is determined.

A stereo camera system of the present disclosure is a stereo camera system in which a first imaging device, a second imaging device, and an information presentation device are connected via a network. The first imaging device is fixed using a first chassis, and the second imaging device is fixed using a second chassis. The information presentation device has an image acquisition unit, a parameter deriving unit, an abnormality detection unit, and a presentation unit. The image acquisition unit acquires a first which is captured by the first, imaging device and a second image which is captured by the second imaging device via the network. The parameter deriving unit sequentially derives parameters for deriving three-dimensional coordinates from the first image and the second image. The abnormality detection unit determines presence or absence of an abnormality in a relative positional relationship or a relative relationship of pose between the first imaging device and the second imaging device according to the sequentially derived parameters. The presentation unit presents warning information including an instruction that there is an abnormality in a case where the abnormality is determined.

An information presentation method of the present disclosure includes acquiring a first image which is captured by a first imaging device and a second image which is captured by a second imaging device, sequentially deriving parameters for deriving three-dimensional coordinates from the first image and the second image, determining presence or absence of an abnormality in a relative positional relationship or a relative relationship of pose between the first imaging device and the second imaging device according to the sequentially derived parameters, and presenting warning information including an instruction that there is an abnormality using a presentation unit in a case where the abnormality is determined.

According to the present disclosure, it is possible to easily recognize a calibration abnormality of the imaging device.

BRIEF DESCRIPTION OF DRAWINGS

FIG. 4 is a flow chart illustrating an example of an operation procedure of a server device in the first embodiment;

DETAILED DESCRIPTION OF THE PREFERRED EMBODIMENTS

Embodiments of the present disclosure will be described below with reference to the drawings.

In a case where a stereo camera is formed using one chassis, relative positions between two imaging units are determined relatively easily. However, when the distance between the fixed two imaging units is short, it is difficult to measure distance to a far off subject. In addition, it is necessary to prepare a large chassis in order to separate the distance between the two imaging units.

In contrast to this, in order to improve degree of freedom of the disposition, separately installing the two imaging units, and forming the stereo camera system is considered. The stereo camera system measures three-dimensional coordinates of matching observation points in a scene that is captured by the two imaging devices. In this case, it is necessary to perform calibration, for example, during installation or after installation of the imaging devices such that it is possible to appropriately estimate the position and the pose of the two imaging devices. In a case where calibration is not appropriately performed it is difficult to capture the same scene using the two imaging devices, and measure the three-dimensional coordinates.

In addition, for example, in the stereo camera system, after installation, there is a possibility that at least one of the two imaging devices positionally deviates from a predetermined position caused by a gust of wind or impact outdoors. That is, there is a risk that that an abnormality occurs in calibration between the two imaging devices.

In addition, in a case where the position or pose of at least one of the two imaging devices is deviated, even if the captured image is confirmed, it is difficult to ascertain a degree of deviation of the position or the pose of which imaging device from a remote place.

In this manner, in the three-dimensional position information recovery device in Japanese Patent Unexamined Publication No. 09-237341, in a case where the stereo camera system is formed by separately installing the two imaging devices, it is difficult to recognize a calibration abnormality of the imaging devices.

The information presentation device, the stereo camera system, and the information presentation method in which it is possible to easily recognize a calibration abnormality of the imaging device will be described below.

For example, the information presentation device of the embodiments is applied below to a server device, a personal computer (PC), a portable terminal (for example, a smartphone, or a tablet terminal), and a monitoring device. For example, the stereo camera system of the embodiments is applied to a monitoring system below.

First Exemplary Embodiment

Figure 1:
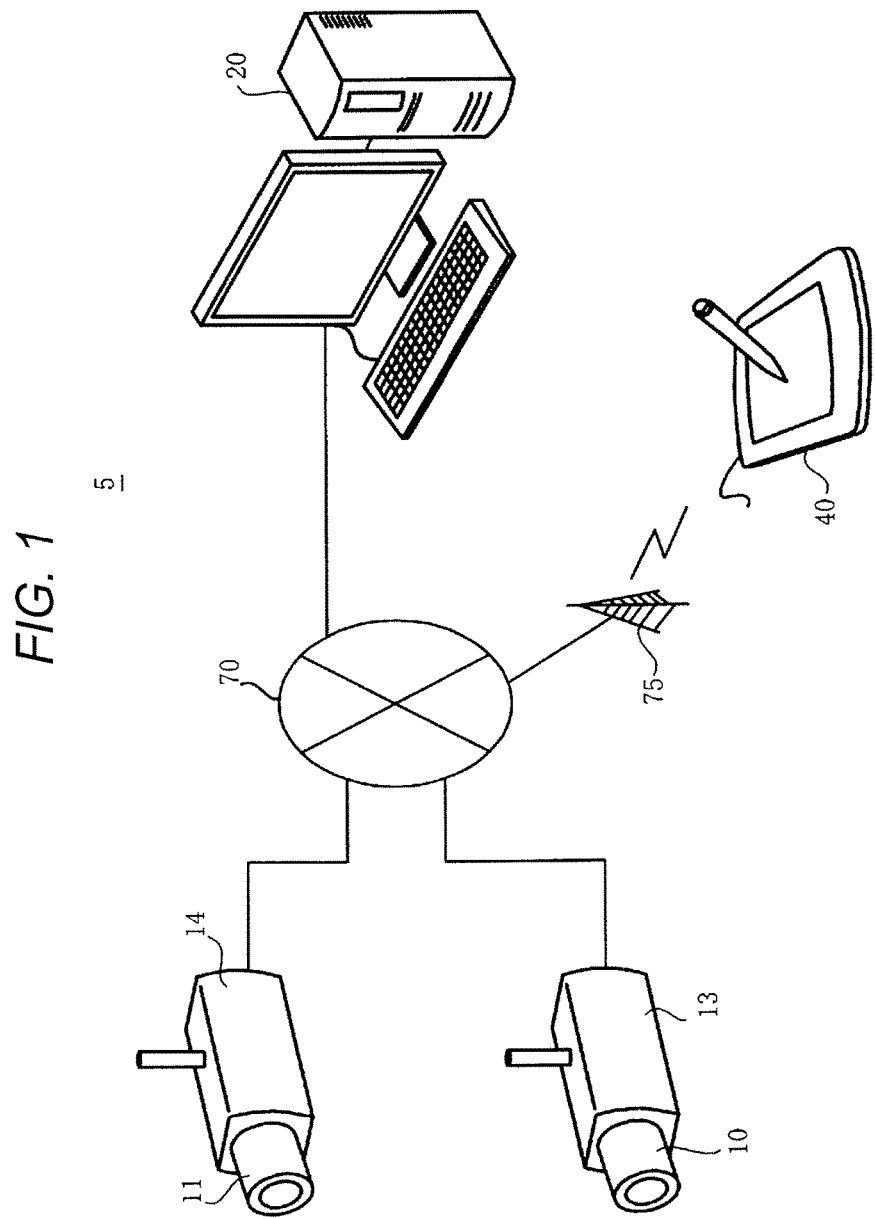
FIG. 1 is a schematic diagram illustrating an outline configuration example of a stereo camera system in a first embodiment.

FIG. 1 is a schematic diagram illustrating an outline configuration example of stereo camera system 5 in a first embodiment. Stereo camera system 5 includes first camera 10, second camera 11, server device 20, and tablet terminal 40. First camera 10, second camera 11, server device 20, and tablet terminal 40 are connected via network 70.

First camera 10 and second camera 11 are examples of the imaging device. Although not illustrated, first camera 10 and second camera 11 have, for example, an imaging unit which captures an image including the subject and a communicator which transmits the captured image to server device 20. For example, the imaging device includes a monitoring camera, a vehicle camera, an industrial camera, a medical camera, and a consumer camera. Here, it is preferable to synchronize the time of first camera 10 and second camera 11.

First camera 10 captures the first image of the predetermined scene that includes the subject (for example, an image of the left side), and transfers the captured image data to server device 20 via network 70.

Second camera 11 captures the second image of the predetermined scene that includes the subject (for example, an image of the right side), and transfers the captured image data to server device 20 via network 70. That is, second camera 11 captures the same scene and the same subject from a different direction from the first camera 10.

First camera 10 and second camera 11 respectively have first chassis 13 and second chassis 14, and for example, are fixed cameras which are fixed to a ceiling, a wall, or at another position. First camera 10 and second camera 11 may be PTZ cameras which perform at least one of panning, tilting, and zooming (also referred to as PTZ), and may be cameras in which PTZ values are set as fixed values.

Here, for example, as long as focal distances, optical axis coordinates, and distortion correction coefficients of first camera 10 and second camera 11 are known, the focal distances, optical axis coordinates, and distortion correction coefficients may be varied. For example, first camera 10 and second camera 11 may carry out distortion correction based on the distortion correction coefficients with respect to the captured image. In the present embodiment, a distorted corrected image may be included in the image.

Server device 20 receives the image data from first camera 10 and second camera 11 via network 70, and performs various imaging processes which will be described later (for example, feature point extraction, matching point extraction, camera parameter estimation, and three-dimensional coordinate calculation).

For example, tablet terminal 40 is connected to server device 20 via network 70 and base-station 75, receives image data from server device 20, and performs image processes in the same manner as server device 20. Here, tablet terminal 40 may not be connected to server device 20, may be directly connected to first camera 10 and second camera 11 via network 70 and base-station 75, and may carry out imaging processing with respect to image data which is transmitted from first camera 10 and second camera 11.

Figure 2:
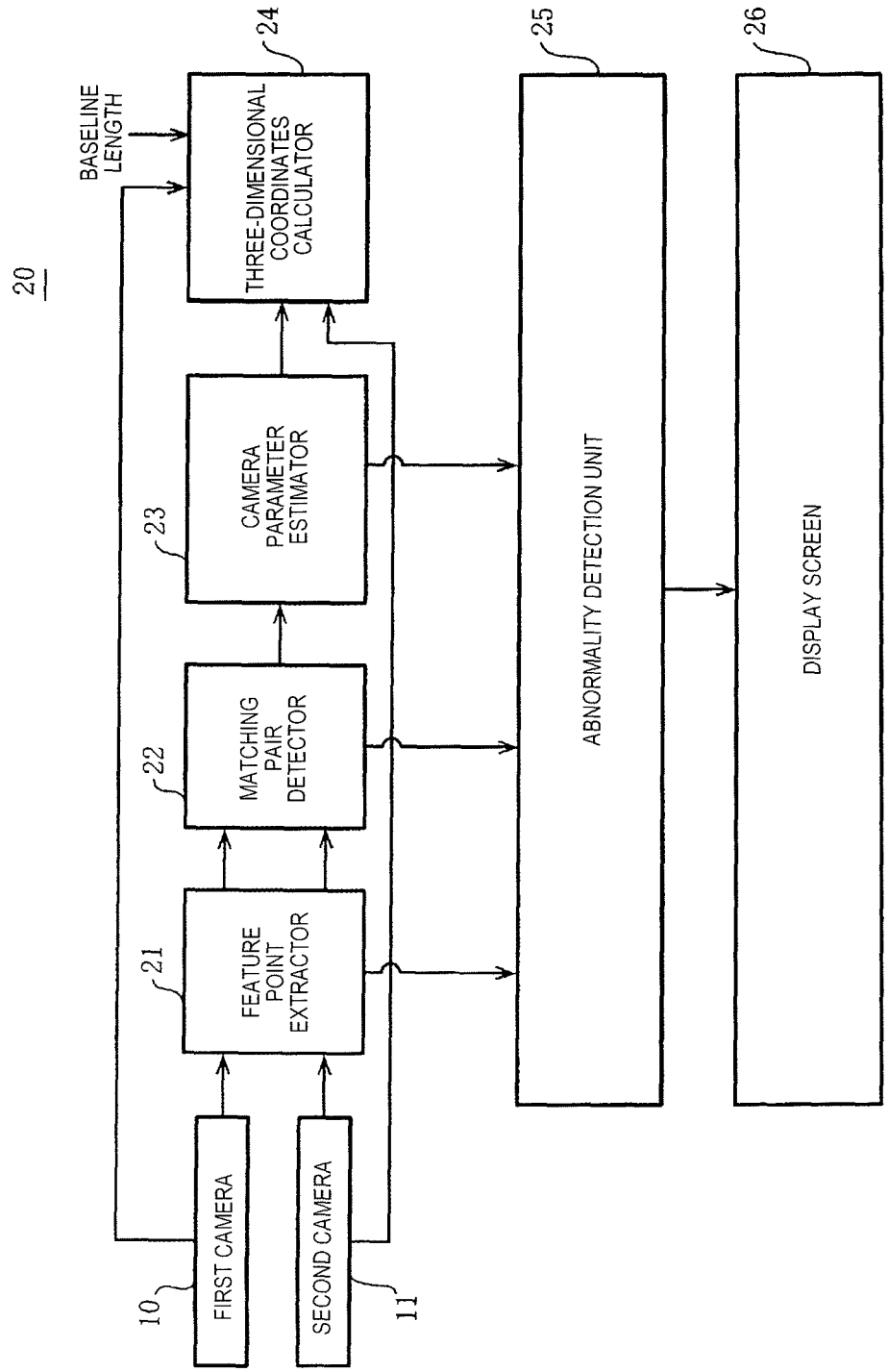
FIG. 2 is a block diagram illustrating a configuration example of a server device in the first embodiment.

FIG. 2 is a block diagram illustrating a configuration example of server device 20. The server device 20 has feature point extractor 21, matching pair detector 22, camera parameter estimator 23, three-dimensional coordinates calculator 24, abnormality detection unit 25, and display screen 26.

Feature point extractor 21 sequentially acquires and analyzes a first camera image which is captured by first camera 10 and a second camera image which is captured by second camera 11. For example, first camera 10 is a camera which is disposed on the left side of the two cameras. For example, second camera 11 is a camera which is disposed on the right side of the two cameras. In this case, the first camera image is a left camera image, and the second camera image is a right camera image. Feature point extractor 21 has a function as an image acquisition unit.

For example, feature point extractor 21 sequentially detects feature points (for example, points in a region in which the edge is strong). For example, in the detection of the feature points, an algorithm is used in which the image is enlarged, reduced, or extracts an invariant local feature amount with respect to rotation. For example, the algorithm includes a scale-invariant feature transform (SIFT) and speed-up robust features (SURF).

Figure 3A:
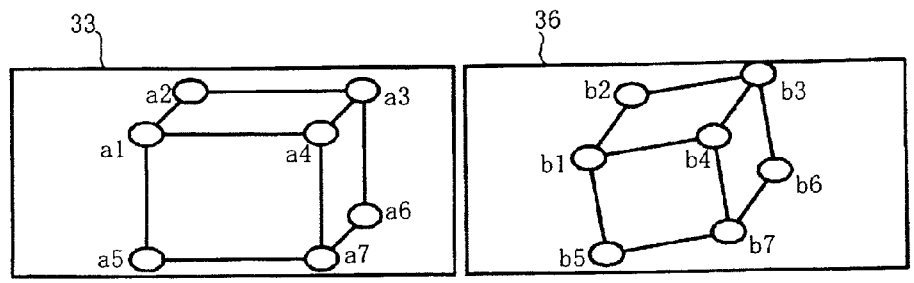
FIG. 3A is a schematic diagram describing an example of a parameter for deriving three-dimensional coordinates in the first embodiment.
Figure 3B:
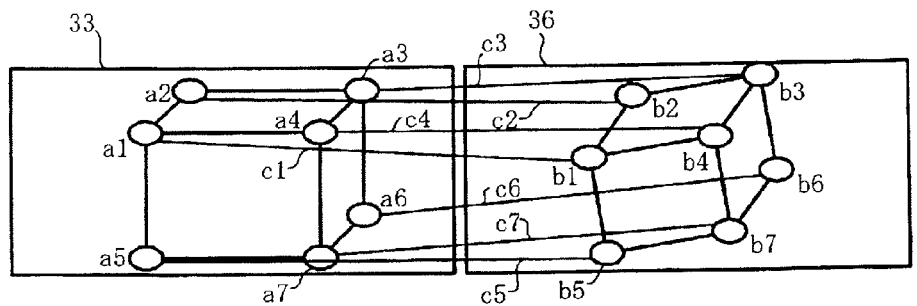
FIG. 3B is a schematic diagram describing an example of a parameter for deriving three-dimensional coordinates in the first embodiment.
Figure 3C:
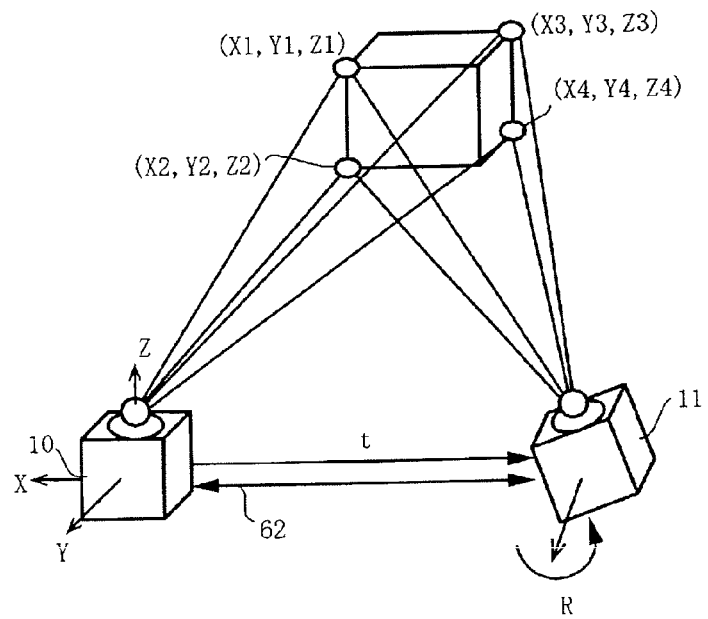
FIG. 3C is a schematic diagram describing an example of a parameter for deriving three-dimensional coordinates in the first embodiment.

FIGS. 3A to 3C are schematic diagrams for describing an example of a parameter for deriving three-dimensional coordinates. The three-dimensional coordinates indicate coordinates in a three-dimensional space in a case where the position of first camera 10 is set as a principal point (0, 0, 0). The three-dimensional coordinates indicate coordinates of target points at which the predetermined points that are included in the first camera image and the second camera image are reverse projected (three-dimensional reconstruction). For example, parameters for deriving the three-dimensional coordinates (simply referred to as parameters) include feature points, matching point pairs, and position and pose of the camera.

For example, as shown in FIG. 3A, feature point extractor 21 detects feature points a1 to a7 from first camera image 33, and detects feature points b1 to b7 from second camera image 36. In a case where it is not necessary to particularly distinguish feature points a1 to a7, a feature point a is simply referred to. In the same manner, in a case where it is not necessary to particularly distinguish feature points b1 to b7, a feature point b is simply referred to. For example, the number of feature points is considered in a case where the position and pose of the cameras are estimated. The greater the number of feature points, the greater the estimation accuracy in which the position and pose of second camera 11 is estimated with respect to first camera 10 increases.

For example, as shown in FIG. 3B, matching pair detector 22 sequentially detects feature points with a high degree of similarity which are included in first camera image 33 and second camera image 36 are set as matching pairs (an example of matching points), and detects matching pair information (image coordinate pair information).

For example, the matching pair information includes information in which the feature points in first camera image 33 and feature points in the second camera image 36 which are matching points are associated (paired). For example, the degree of similarity being high includes the following situation: when a feature point in first camera image 33 and a feature point in second camera image 36 are assigned to a corner of a window, angles of the corners in images 33 and 36 are similar, and a difference of the angles is less than a predetermined value.

For example, matching pair detector 22 detects matching points using a known technology (for example, the technology described in Japanese Patent Unexamined Publication No. 09-237341).

In FIG. 3B, feature point a1 which is included in first camera image 33, feature point b1 which is included in second camera image 36 are detected as matching points and matching pair information is detected. In addition, feature point a2 which is included in first camera image 33, feature point b2 which is included in second camera image 36 are detected as matching points and detected as matching pair information. In the same manner, feature points a3 to a7 and feature points b3 to b7 are detected as each matching point, and each set of matching pair information is output.

In FIG. 3B, the matching pair information associates feature points a1 to the a7 and feature points b1 to b7 which are respectively associated to linking lines (matching lines) c1 to c7. For example, the number of matching pairs is considered in a case where the position and pose of the cameras are estimated. The greater the number of matching pairs, the greater the estimation accuracy in which the position and pose of second camera 11 is estimated with respect to first camera 10 increases.

As shown in FIG. 3C, for example, camera parameter estimator 23 sequentially estimates the position and pose of second camera 11 with respect to first camera 10 based on matching pair information, a focal distance of first camera 10, a focal distance of second camera 11, optical axis coordinates of first camera 10, and optical axis coordinates of second camera 11.

The optical coordinates indicate coordinates which match the center of a lens in the captured image. For example, the position of second camera 11 with respect to first camera 10 is indicated by translation vector t. For example, the pose of second camera 11 with respect to first camera 10 is illustrated by rotation matrix R.

Camera parameter estimator 23 estimates camera parameters (for example, translation vector t and rotation matrix R) using a known technology (for example, the technology described in Japanese Patent Unexamined Publication No. 09-237341). The translation vector t is equivalent to the three-dimensional translation vector which is described in Japanese Patent Unexamined Publication No. 09-237341. Rotation matrix R is equivalent the three-dimensional rotation matrix which is described in Japanese Patent Unexamined Publication No. 09-237341.

For example, the translation vector t is represented in (Equation 1).

$$p = \begin{bmatrix} px \\ py \\ pz \end{bmatrix} \quad \text{(Equation 1)}$$

px, py, and pz respectively represent translation vector components in X axis, Y axis, and Z axis directions.

For example, the rotation matrix R is represented by (Equation 2).

$$R = R(\theta z) \cdot R(\theta y) \cdot R(\theta x) \quad \text{(Equation 2)}$$

θz, θy, and θx respectively represent rotation angles (radians) around the Z axis, Y axis, and X axis, and represent components of rotation angles (rotating components) of each axis. R (θz), R (θy), and R (θx) respectively represent components of the rotation matrix R of the Z axis, the Y axis, and the X axis. Here, the rotation angle θ=0 indicates a state in which first camera 10 and second camera 11 are parallel.

Three-dimensional coordinates calculator 24 sequentially calculates three-dimensional coordinates (X, Y, Z) of target points based matching pair information, internal parameters and external parameters of first camera 10, internal parameters and external parameters of second camera 11, and baseline lengths 62 (refer to FIG. 3C). The target points are points where the feature points of first camera image 33 which are included in the matching pair are reverse projected.

For example, three-dimensional coordinates calculator 24 calculates three-dimensional coordinates of the target points using a known technology (for example, the technology described in Japanese Patent Unexamined Publication No. 09-237341).

For example, the internal parameters include focal distances, optical axis coordinates, aspect ratios, and skew distortion of the first camera 10 and second camera 11. For example, the external parameters include the position (three components of X axis, Y axis, and Z axis) and pose (three rotating components along the X axis, the Y axis, and the Z axis) of second camera 11 with respect to the first camera 10. Baseline lengths 62 are distanced from first camera 10 and second camera 11. For example, the internal parameters and the external parameters are determined for each camera.

The internal parameters are held in advance by a memory which is not shown in each camera. The external parameters are sequentially derived, and are held in the memory which is not shown in the drawings. For example, baseline lengths 62 are held in advance by the memory which is not shown in the drawings in at least one of first camera 10 and second camera 11.

Feature point extractor 21, matching pair detector 22, and camera parameter estimator 23 are examples in the parameter deriving unit which sequentially derives the parameters for deriving the three-dimensional coordinates.

Abnormality detection unit 25 determines the presence or absence of a calibration abnormality of the camera, that is, an abnormality in a relative positional relationship of first camera 10 and second camera 11 (hereinafter referred to as "calibration abnormality"). For example, there being a calibration abnormality includes a change of the position, pose, or the like of at least one of first camera 10 and second camera 11, and generation of a calibration abnormality. For example, there being a calibration abnormality includes a change in which a large number of feature points and matching points in order to change the subject.

For example, abnormality detection unit 25 counts the number of feature points which are extracted using feature point extractor 21 (hereinafter referred to as "feature point number"), and it is determined that there is a calibration abnormality in a case where the feature point number is less than a first threshold.

For example, abnormality detection unit 25 counts the number of matching pairs which are detected using matching pair detector 22 (hereinafter referred to as "matching pair number"), and it is determined that there is a calibration abnormality in a case where the matching pair number is less than a second threshold.

For example, abnormality detection unit 25 compares the translation vector components which are estimated by camera parameter estimator 23 and the translation vector components which are estimated in the past. For example, the translation vector components which are estimated in the past may be the translation vector components which are estimated immediately before, and may be an average value or a median value of a plurality (for example, ten frames) of translation vector components which are estimated in the past.

As a result of comparison, in a case where at least one translation vector component is greatly varied (for example, a first predetermined value or more), abnormality detection unit 25 determines that there is a calibration abnormality by detecting large variation in position of second camera 11 with respect to first camera 10. Since the presence or absence of the calibration abnormality is determined in each translation vector component, here the detection value is three. Here, an allowable range (amount of variation) from the translation vector components which are estimated in the past is referred to as a first variation range. Here, variation of the position of second camera 11 with respect to first camera 10 includes variation of the position of at least one first camera 10 and second camera 11.

For example, the abnormality detection unit 25 compares the rotation components which are estimated by camera parameter estimator 23 and the rotation components which are estimated in the past. For example, the rotation components which are estimated in the past may be the rotation components which are estimated immediately before, and may be an average value or a median value of a plurality (for example, ten frames) of rotation components which are estimated in the past.

As a result of comparison, in a case where at least one rotation component is greatly varied (for example, a second predetermined value or more), abnormality detection unit 25 determines that there is a calibration abnormality by detecting large variation in pose of second camera 11 with respect to first camera 10. Since the presence or absence of the calibration abnormality is determined in each rotation component, here the detection value is three. Here, an allowable range (amount of variation) from the rotation components which are estimated in the past is referred to as a second variation range. Here, variation of the pose of second camera 11 with respect to first camera 10 includes variation of the pose of at least one first camera 10 and second camera 11.

For example, it may be determined that there is a calibration abnormality in a case where abnormality detection unit 25 reduces or increases the number of feature points more rapidly than the number of feature points which are counted in the past (for example, a third predetermined value or more). For example, it may be determined that there is a calibration abnormality in a case where abnormality detection unit 25 reduces or increases the number of matching pairs more rapidly than the number of matching pairs which are counted in the past (for example, a fourth predetermined value or more).

Display screen 26 displays all kinds of information. For example, display screen 26 displays information which indicates time variation of each parameter, and information on various warning messages accompanying calibration abnormality and causes of calibration abnormality. Display screen 26 is an example of the presentation unit.

Next, an operation example of stereo camera system 5 will be described.

FIG. 4 is a flow chart illustrating an example of an operation procedure of server device 20. For example, the process in FIG. 4 is performed at a timing of once a day or once an hour after installation of first camera 10 and second camera 11.

First, feature point extractor 21 takes first camera image 33 which is captured by first camera 10 and second camera image 36 which is captured by second camera 11 (S1).

For example, as shown in FIG. 3A, feature point extractor 21 respectively extracts feature points using a feature amount from first camera image 33 and second camera image 36 (S2).

As shown in FIG. 3B, for example, matching pair detector 22 detects a matching pair by detecting matching between the feature point a which is included in first camera image 33 and the feature point b which is included in second camera image 36 from the degree of similarity of the extracted feature points, and acquires the matching pair information (S3).

For example, camera parameter estimator 23 estimates the position and pose of second camera 11 with respect to first camera 10 based on the matching pair information, the focal distances, and optical axis coordinates (S4).

Three-dimensional coordinates calculator 24 calculates the three-dimensional coordinates of the target points where the feature points which are included in first camera image 33 that is included in the feature point pair are reverse projected based on matching pair information, internal parameters, external parameters, and baseline lengths 62 (S5).

Abnormality detection unit 25 determines the presence or absence of calibration abnormality (S6). For example, in a case where a predetermined criterion is satisfied, abnormality detection unit 25 determines that there is a calibration abnormality. For example, the predetermined criterion includes a case where the number of feature points is lower than the first threshold, a case where the number of matching pairs is lower than the second threshold, a case where the position and the pose of second camera 11 are greatly varied, a case where the number of feature points is rapidly changed, and a case where the number of matching pairs is rapidly changed.

For example, abnormality detection unit 25 instructs so as to display information on time changes of each parameter as a detection circumstance of a calibration abnormality (S7). For example, information on time change includes time change with respect to the first threshold of the number of feature points, time change with respect to the second threshold of the number of matching pairs, time change with respect to the first variation range of the translation vector components of second camera 11, and time change with respect to the second variation range of the rotation components of second camera 11.

Display screen 26 displays the detection circumstance according to an instruction from abnormality detection unit 25 (S7).

Figure 5A:
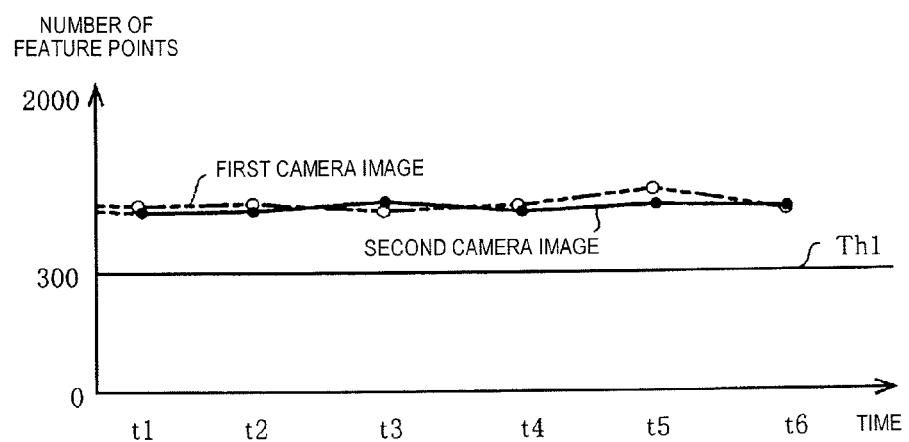
FIG. 5A is a graph illustrating an example of detection circumstances of the number of feature points in the first embodiment.
Figure 5B:
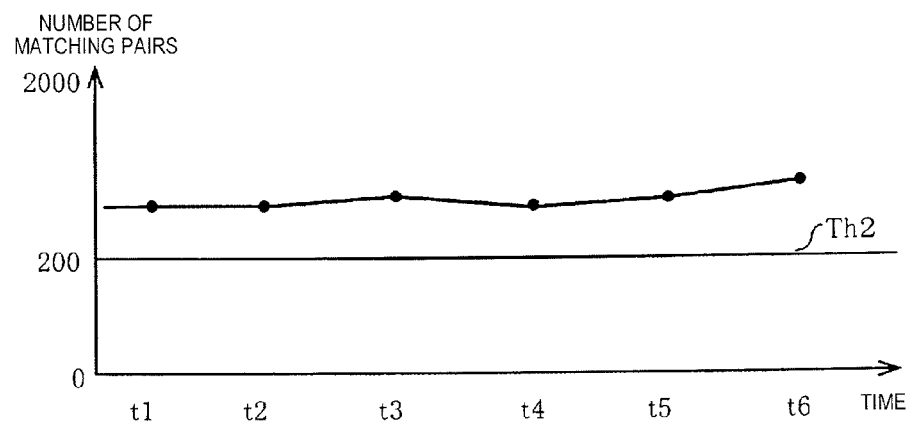
FIG. 5B is a graph illustrating an example of detection circumstances of the number of matching pairs in the first embodiment.

FIGS. 5A and 5B are graphs illustrating an example of detection circumstances of the number of the feature points and the number of matching pairs.

FIG. 5A is a graph illustrating a time change example of the number of feature points. In FIG. 5A, for example, first threshold Th1 is set to a value of 300. In FIG. 5A, since the number of feature points which are included in first camera image 33 and the number of feature points which are included in second camera image 36 exceed first threshold Th1 at any time, it is determined that there is no calibration abnormality.

FIG. 5B is a graph illustrating a time change example of the number of matching pairs. In FIG. 5B, for example, second threshold Th2 is set to a value of 200. In FIG. 5B, at any time, since the number of matching pairs exceeds second threshold Th2, it is determined that there is no calibration abnormality.

Figure 6A:
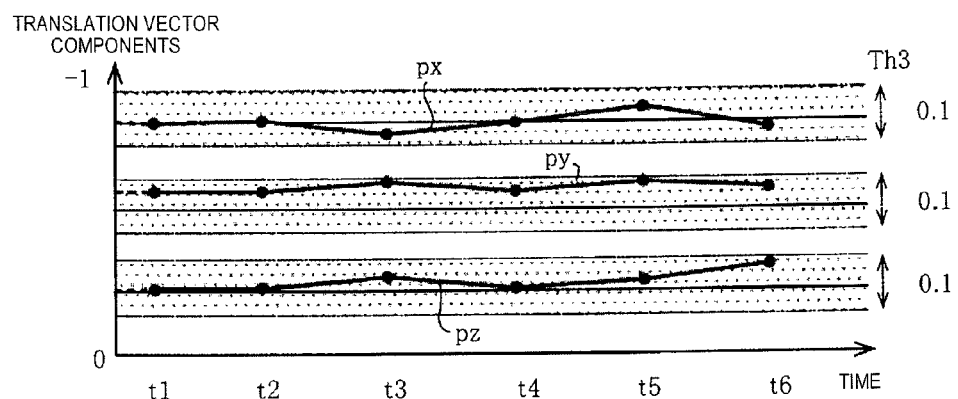
FIG. 6A is a graph illustrating an example of detection circumstances of a position or pose of a second camera in the first embodiment.
Figure 6B:
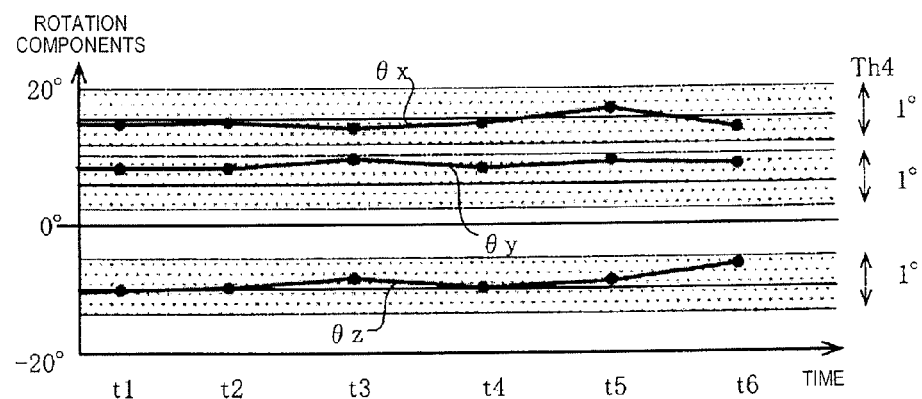
FIG. 6B is a graph illustrating an example of detection circumstances of a position or pose of the second camera in the first embodiment.

FIGS. 6A and 6B are graphs illustrating an example of detection circumstances of the position or pose of second camera 11 with respect to first camera 10.

FIG. 6A is a graph illustrating a time change example of the translation vector components px, py, and pz. In FIG. 6A, for example, first variation range Th3 is respectively set to a proportion of 0.1 (that is, 10%) of a value of the translation vector components px, py, and pz. At any time, since the variation range of the translation vector components px, py, and pz falls within first variation range Th3, it is determined that there is no calibration abnormality.

FIG. 6B is a graph illustrating a time change example of the rotating components. In FIG. 6B, for example, second variation range Th4 is respectively set to 1°. At any time, since rotating components θx, θy, θz fall within second variation range Th4, it is determined that there is no calibration abnormality.

Abnormality detection unit 25 determines whether or not it is determined that at least one parameter is a calibration abnormality as a result of detection based on each parameter (S8). In a case where there is no parameter in which a calibration abnormality is determined, the present operation ends.

Meanwhile, in a case where there is a parameter in which the calibration abnormality is determined, for example, display screen 26 displays a graph of time change of the parameter and a warning message (S9). For example, in the warning message, content is included in which a coping method is made known to a user according to a cause of the detection of a calibration abnormality. After this, the present operation ends.

Figure 7:
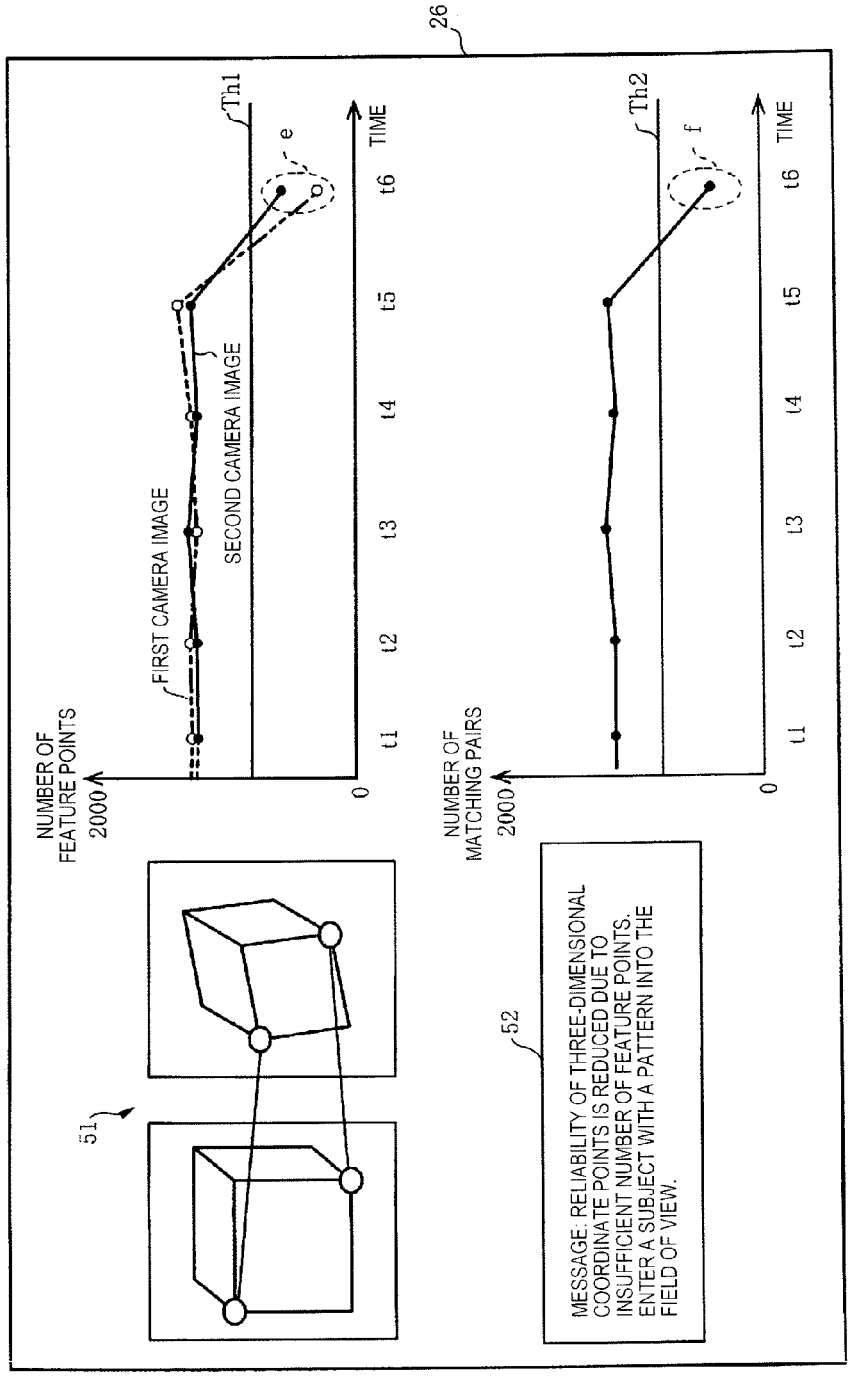
FIG. 7 is a schematic diagram illustrating an example screen in a case where an abnormality is determined using the number of feature points in the first embodiment.

FIG. 7 is a schematic diagram illustrating an example screen of display screen 26 which is displayed in a case where calibration abnormality is determined according to the number of feature points.

In the graph which represents the number of feature points, as shown in portion e (a broken line portion) in FIG. 7, the number of feature points is lower than first threshold Th1 at time t6. In the graph which represents the number of matching pairs, as shown in portion f (a broken line portion) in FIG. 7, the number of matching pairs is lower than second threshold Th2 at time t6.

In this case, for example, image 51 which represents an insufficiency in the number of feature points as a cause of the calibration abnormality, and warning message 52 are displayed on display screen 26. For example, information on an instruction that the number of feature points is insufficient and reliability of the three-dimensional coordinates of the target points is reduced, and an instruction where the subject in which there is a pattern enters into the field of view (screen) is included in warning message 52. Here, even in a case where first threshold Th1 and second threshold Th2 are lower at a time other than time t6, in the same manner it is determined that there is a calibration abnormality.

For example, as the cause of occurrence of the change in the number of feature points, there being no subject with a pattern that enters the field of view, or being moved outside the field of view are considered. For example, in a case where the number of feature points is rapidly changed, it is considered that the position or pose of the camera is changed due to a gust of wind being generated, or an impact being applied.

In this manner, for example, in a case where the change in the number of feature points occurs, server device 20 displays image 51 which represents that the number of feature points is insufficient and the warning message 52 using display screen 26. Thereby, the user also instructs a coping method with respect to the calibration abnormality which is caused by an insufficient number of feature points via display screen 26. For example, the user is able to recognize that the field of view of first camera 10 or second camera 11 may be modified such that the subject which has a pattern enters the field of view. Accordingly, the user is able to notice and cope with the calibration abnormality early using the display screen which is exemplified in FIG. 7.

Figure 8:
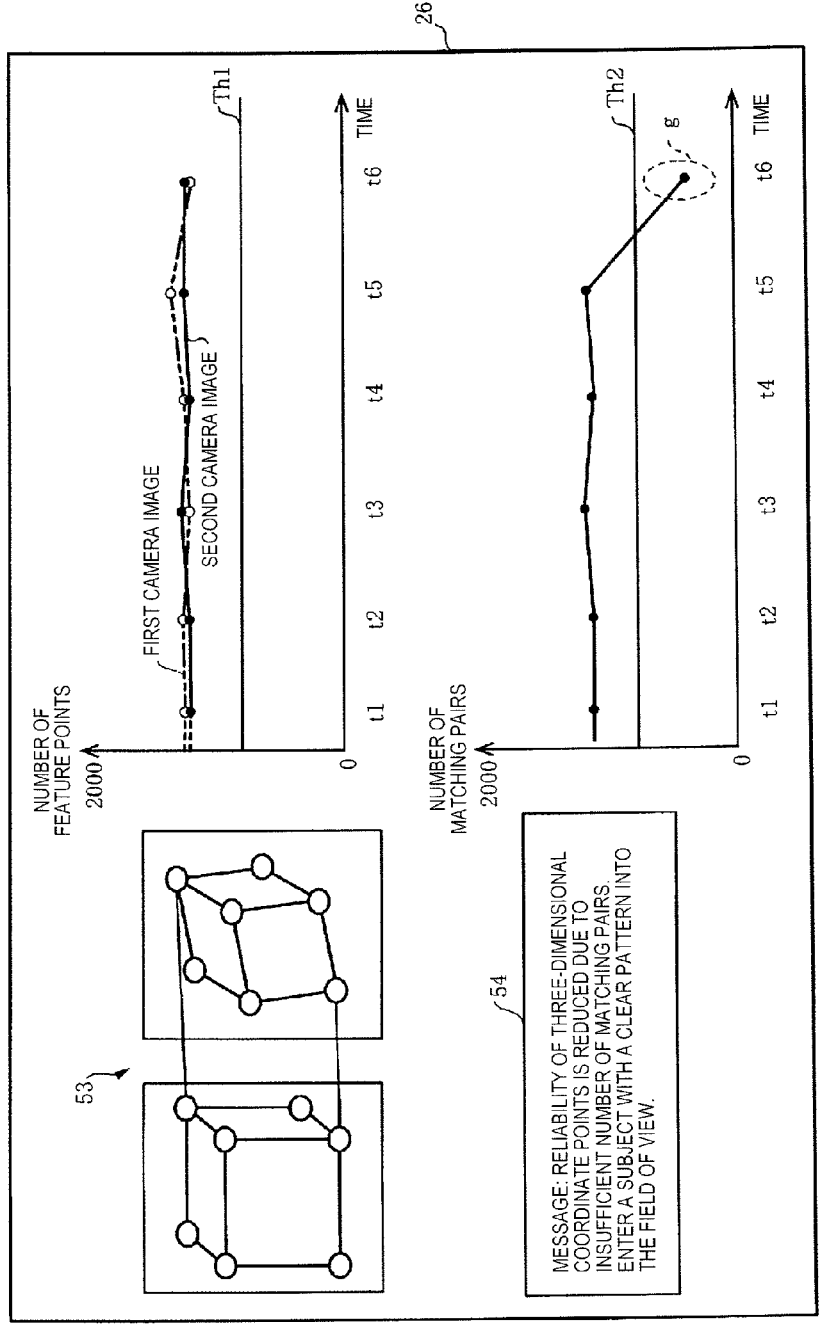
FIG. 8 is a schematic diagram illustrating an example screen in a case where an abnormality is determined using the number of matching pairs in the first embodiment.

FIG. 8 is a schematic diagram illustrating an example screen of display screen 26 which is displayed in a case where the calibration abnormality is determined according to the number of matching pairs. In the graph which represents the number of feature points, at any time, the number of feature points exceeds first threshold Th1. Meanwhile, in the graph which represents the number of matching pairs, as shown in portion g (a broken line portion) in FIG. 8, the number of matching pairs is lower than second threshold Th2 at time t6.

In this case, for example, image 53 which represents an insufficiency in the number of matching pairs as a cause of the calibration abnormality and warning message 54 are displayed on display screen 26. For example, information on an instruction that the number of matching pairs is insufficient and reliability of the three-dimensional coordinates of the target points is reduced, and an instruction where the subject in which the pattern is clear enters into the field of view (screen) is included in warning message 54. The subject in which the pattern is clear is an example of a subject where it is possible increase the number of matching points, but another subject may be added within the camera field of view. Here, even in a case where second threshold Th2 is lower at a time other than time t6, in the same manner it is determined that there is a calibration abnormality.

The cause of the occurrence of the change of the number of matching pairs is considered to be the cause of the occurrence of the change in the number of feature points, for example, in the same manner.

In this manner, for example, in a case where the change of the number of matching pairs occurs, server device 20 displays image 53 which represents that the number of matching pairs is insufficient and displays warning message 54 using display screen 26. Thereby, the user also instructs the coping method with respect to the calibration abnormality which is caused by an insufficient number of matching pairs via display screen 26. For example, the user is able to recognize that the field of view of first camera 10 or second camera 11 may be modified such that the subject which has a clear pattern enters the field of view. Accordingly, the user is able to notice and coping with the calibration abnormality early using the display screen which is exemplified in FIG. 8.

The user recognizes that the number of feature points or the number of matching pairs is insufficient, and for example, it is possible to suppress the position or pose of the camera or a reduction in derivation precision of the three-dimensional coordinates by the user coping according to the instructions of warning messages 52 and 54.

Figure 9:
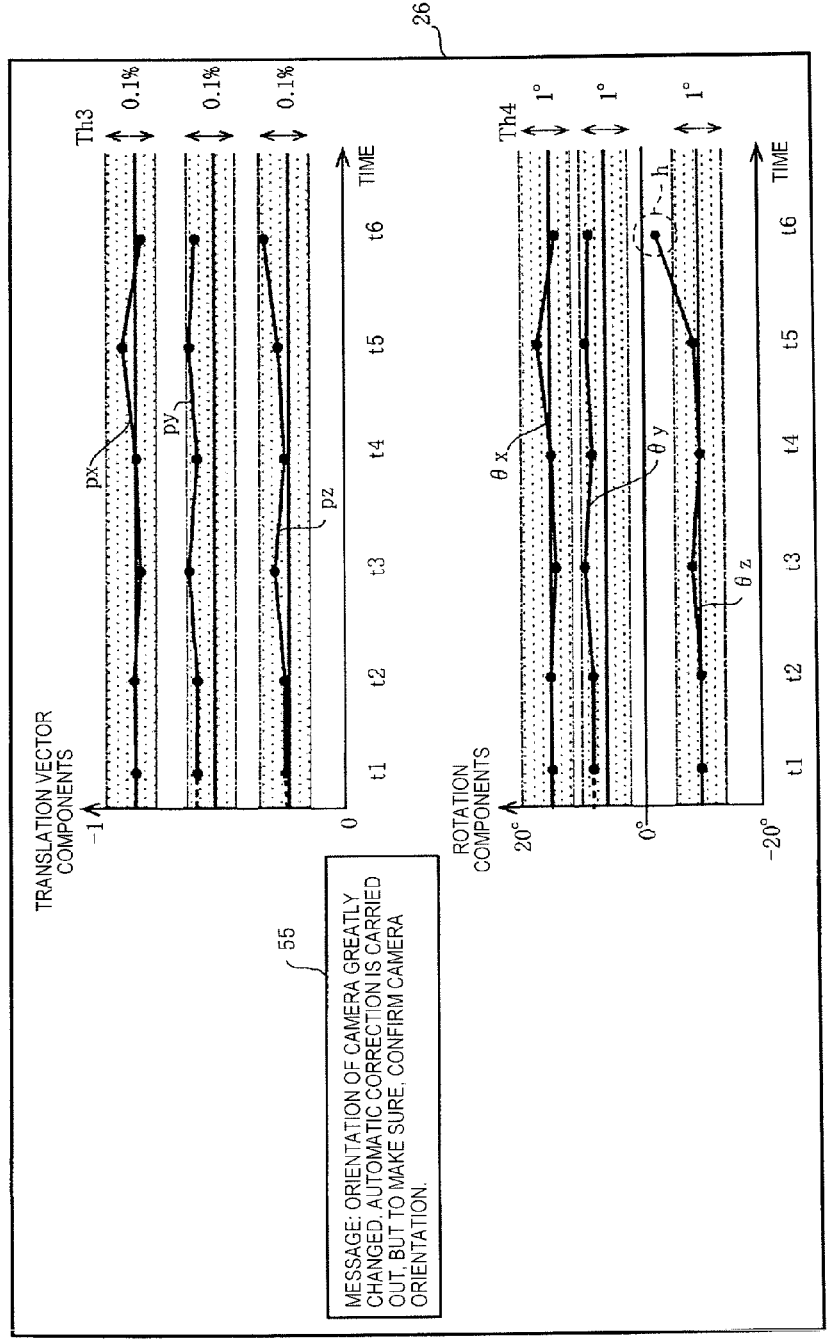
FIG. 9 is a schematic diagram illustrating an example screen in a case where an abnormality is determined using the position and pose in the first embodiment.

FIG. 9 is a schematic diagram illustrating an example screen of display screen 26 which is displayed in a case where a calibration abnormality is determined according to the position and the pose. In the graph which represents the translation vector components, the translation vector components px, py, and pz fall within the range of first variation range Th3. Meanwhile, as indicated by portion h (broken line portion) in FIG. 9, in the graph which represents the rotating components, rotating component θz which represents a rotation angle of a Z axis component is outside the range of second variation range Th4 at time t6.

In this case, for example, warning message 55 is displayed on display screen 26. For example, information on an instruction in which an orientation of at least one of first camera 10 or second camera 11 is greatly changed, and an instruction that the position or the orientation of first camera 10 or second camera 11 is confirmed is included in warning message 55. Here, even in a case of being outside of the range of second threshold Th4 at a time other than time t6, in the same manner, it is determined that there is a calibration abnormality.

For example, it is considered that a gust of wind is generated, or an impact is applied caused by the occurrence of a change in the position or pose of second camera 11 with respect to first camera 10.

In this manner, for example, in a case where a change occurs in the position or the pose of second camera 11 with respect to first camera 10, regardless of the change of the number of feature points or the number of matching pairs, server device 20 displays warning message 55 using display screen 26. Thereby, the user also instructs a coping method with respect to the calibration abnormality which is caused by the change of the position or the pose of the camera via display screen 26. For example, the user recognizes that orientation of first camera 10 or second camera 11 may be confirmed. Accordingly, the user is able to notice and cope with the calibration abnormality early using the display screen which is exemplified in FIG. 9.

First camera 10 and second camera 11 are installed such that the position and the orientation of the respective cameras is fixed, and ordinarily there is no positional deviation after initial installation, and the imaging range is not changed. Accordingly, in a case where a specific phenomenon does not occur, the feature points and matching points which are obtained from the captured image, and the position or the pose of second camera 11 with respect to first camera 10 are not changed. In the case where the feature points, the matching points, and the position or the pose of the camera are changed due to various causes, server device 20 presents (for example, displays) such that the user is able to recognize the change.

According to stereo camera system 5 and server device 20 of the present embodiment, the user is able to estimate from the change of each parameter that the imaging range is changed due to first camera 10 or second camera 11. Accordingly, the user (for example, a server manager or a camera installer) is able to easily recognize the calibration abnormality of the camera, and is able to notice the abnormality early.

For example, the manager of server device 20 is able to easily recognize the calibration abnormality while, for example, confirming a monitor within a monitoring center. Accordingly, for example, the manager of server device 20 is able to instruct such that the positional relationship between the imaging devices is set to a designated state with respect to the camera installer.

For example, when first camera 10 and second camera 11 are installed at a predetermined location, it is possible for a camera installer to install while referencing tablet terminal 40. For example, the camera installer is able to install first camera 10 and second camera 11 by referencing each parameter (for example, information on the number of feature points, the number of matching pairs, and the position or pose of the camera) which are displayed on tablet terminal 40, and warning information (for example, a warning message). Accordingly, the camera installer is able to easily install using the positional relationship relative to first camera 10 and second camera 11 in a designated state, and is able to suppress positional deviation at a designated timing during initial installation or after initial installation.

In addition, even in a case where stereo camera system 5 is formed using first camera 10 and second camera 11 which are fixed not in one chassis, but in separate chassis, it is possible to easily install each camera in a designated state, and improve degree of freedom of installation.

In the present embodiment, first camera 10 and second camera 11 may carry out distortion correction with respect to an image which is captured by the device. By the distortion correction, it is possible to improve each parameter (for example, the number of feature points, the number of matching points, and the position or pose of the camera) and derivation precision of the three-dimensional coordinates. The distortion correction may be performed using server device 20 which acquires an image from each camera.

Here, in the present embodiment, server device 20 may not have three-dimensional coordinates calculator 24. Stereo camera system 5 may not have tablet terminal 40.

Second Exemplary Embodiment

In a second embodiment, a case is mainly assumed in which the camera installer installs first camera 10 and second camera 11. The stereo camera system of the second embodiment is different in the configuration and operation of server device 20A when compared to stereo camera system 5 of the first embodiment.

Figure 10:
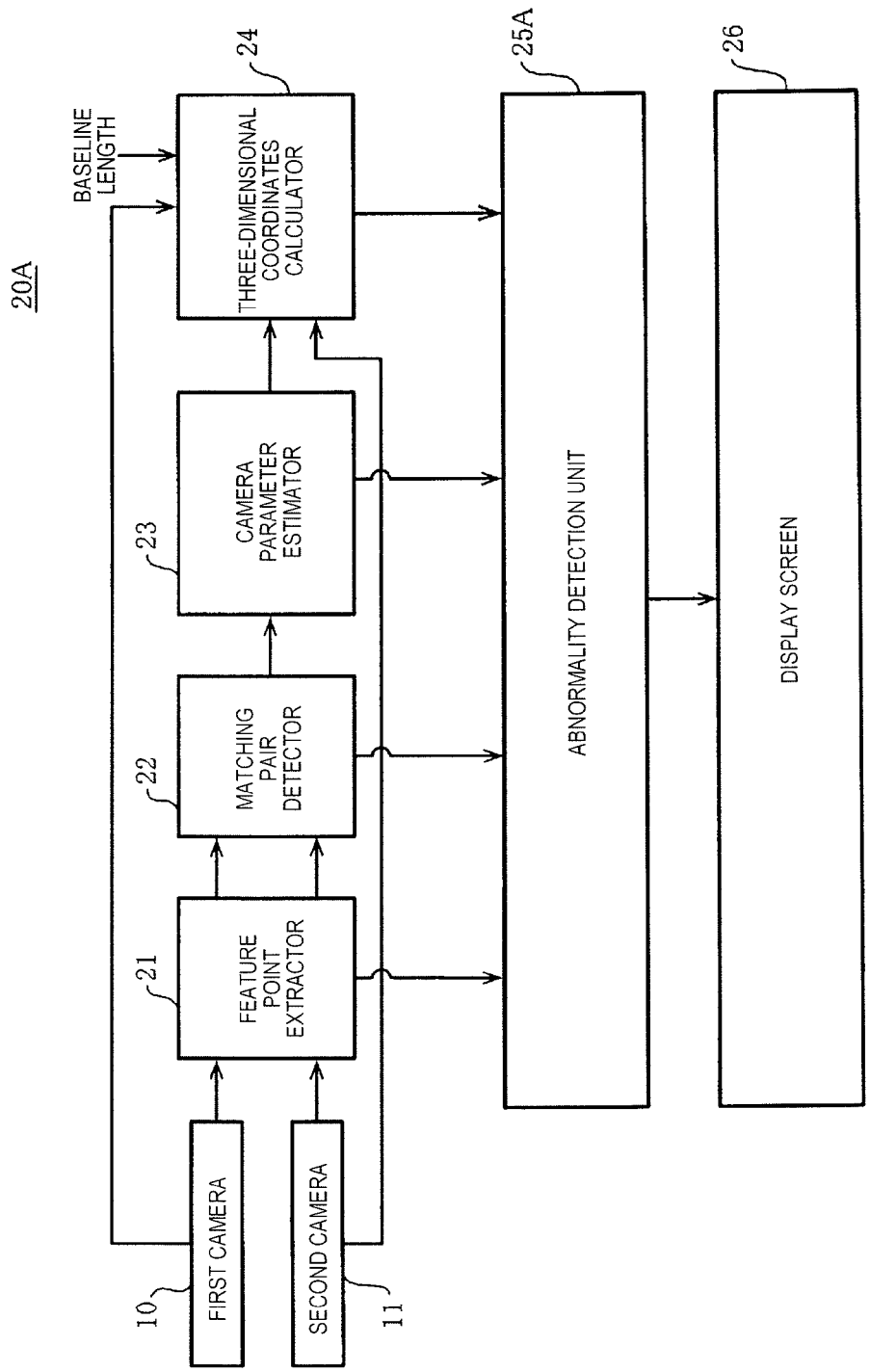
FIG. 10 is a block diagram illustrating a configuration example of a server device in a second embodiment.

FIG. 10 is a block diagram illustrating a configuration example of server device 20A in a second embodiment. In server device 20A of FIG. 10, other description is omitted or simplified by using the same reference numerals for configuration components similar to server device 20 that are indicated in FIG. 2.

When comparing to server device 20, server device 20A has abnormality detection unit 25A in place of abnormality detection unit 25.

Abnormality detection unit 25A has a function of abnormality detection unit 25. In addition, abnormality detection unit 25A sequentially acquires information on the three-dimensional coordinates from three-dimensional coordinates calculator 24, and calculates variation of a plurality of acquired three-dimensional coordinates (for example, standard deviation, or dispersion). Abnormality detection unit 25A detects the variation of the three-dimensional coordinates as a distribution state of the three-dimensional coordinates. In a case where the variation of the three-dimensional coordinates is lower than the third threshold, abnormality detection unit 25A determines that reliability of the three-dimensional coordinates which are calculated by three-dimensional coordinates calculator 24 is low.

In a case where abnormality detection unit 25A determines that reliability of the three-dimensional coordinates is low, for example, display screen 26 displays a warning message which includes an instruction that the reliability of the three-dimensional coordinates is low.

Next, an operation example of stereo camera system 5 will be described.

Figure 11:
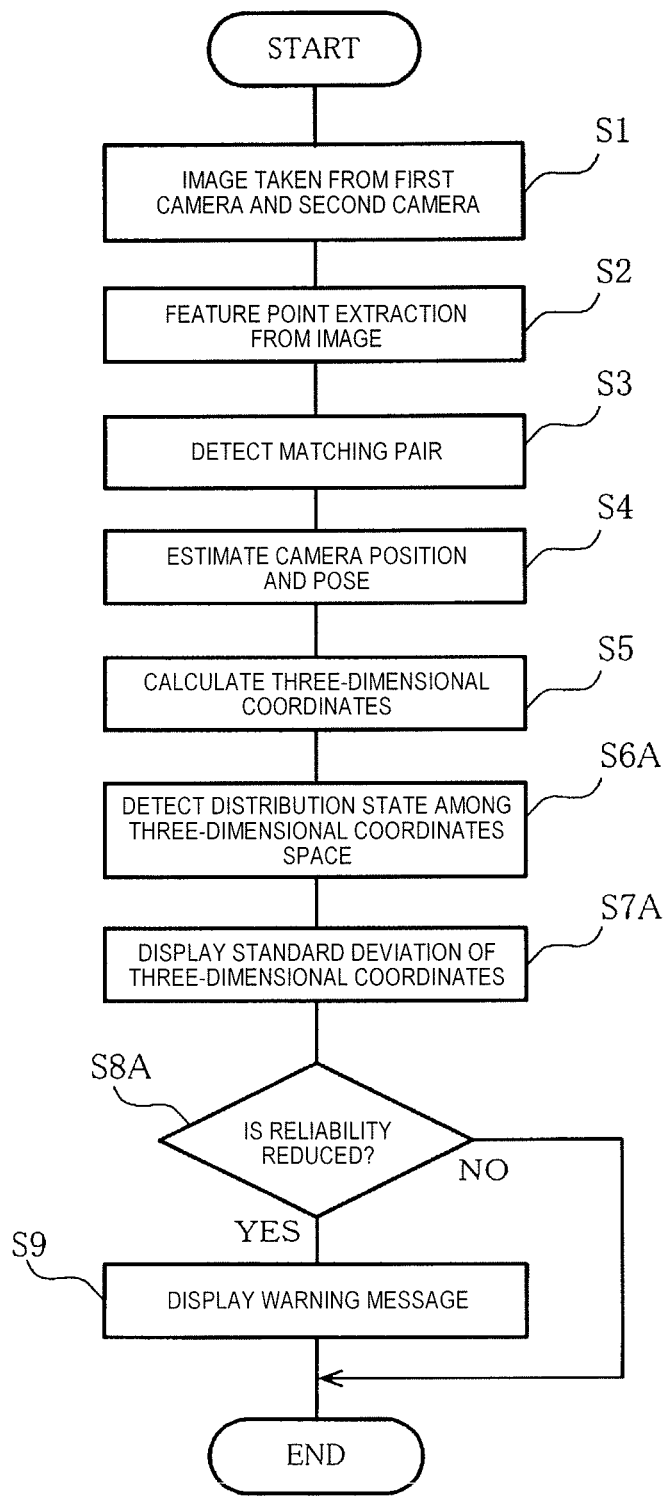
FIG. 11 is a flow chart illustrating an example of an operation procedure of the server device in the second embodiment.

FIG. 11 is a flow chart illustrating an example of an operation procedure of server device 20A. In FIG. 11, the same procedures as the operation procedures of server device 20 indicated in FIG. 4 are given the same step numbers, and other description is omitted or simplified. In FIG. 11, calculation of standard deviation of the three-dimensional coordinates is exemplified as variation of the three-dimensional coordinates.

In step S5, when the three-dimensional coordinates of target points are calculated by reverse projecting feature points of first camera image 33 which are included in a matching pair, abnormality detection unit 25A detects a distribution state of the target points in the three-dimensional coordinates space (S6A). For example, abnormality detection unit 25A calculates standard deviation of the three-dimensional coordinates of the target points.

Abnormality detection unit 25A instructs so as to display the time variation of standard deviation of the three-dimensional coordinates with respect to display screen 26 as detection circumstances of the reliability of the three-dimensional coordinates (S7A). Display screen 26 displays a graph which represents time variation of each axis component (X axis, Y axis, and Z axis) of the standard deviation of the three-dimensional coordinates (refer to FIG. 12).

Abnormality detection unit 25A determines whether or not the reliability of the relative position or pose of second camera 11 which is estimated from the calculated three-dimensional coordinates is reduced (S8A).

In a case where the standard deviation of the three-dimensional coordinates is not lower than third threshold Th5 (for example, a value of 10 in FIG. 12), it is determined that reliability is not reduced. In a case where reliability is not reduced, the present operation ends without change.

Meanwhile, in a case where reliability of relative position or pose of second camera 11 which is estimated from the three-dimensional coordinates is reduced, for example, display screen 26 displays a graph which represents time variation of each axis component of the standard deviation of the three-dimensional coordinates, and a warning message (S9). For example, content which represents the coping method with respect to a reduction of the reliability of the relative position or pose of second camera 11 is included in the warning message. After this, the present operation ends.

Here, in FIG. 11, execution of processes of S6A to S8A is exemplified in place of S6 to S8 in FIG. 4, but the processes of S6A to S8A may be executed along with S6 to S8.

Figure 12:
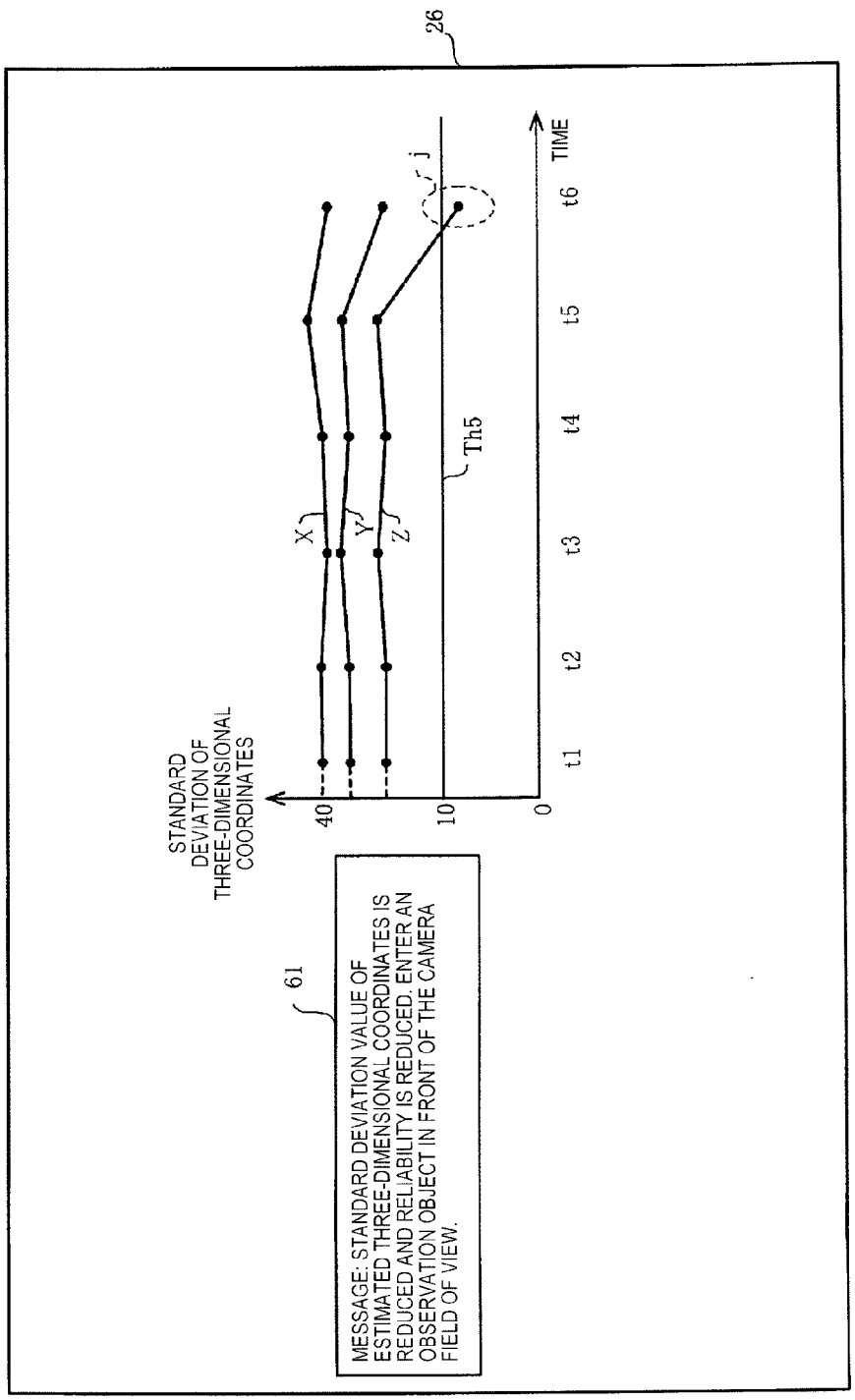
FIG. 12 is a schematic diagram illustrating an example screen in a case where it is determined that reliability of the three-dimensional coordinates is low due to standard deviation of the three-dimensional coordinates in the second embodiment.

FIG. 12 is a schematic diagram illustrating an example screen of display screen 26 which is displayed in the case in which the reliability of the relative position or pose of second camera 11 is reduced. In the graph which represents the time variation of the standard deviation of the three-dimensional coordinates, as shown in portion j (a broken line portion) in FIG. 12, the standard deviation of the Z component is lower than the third threshold Th5 at the time t6.

In this case, warning message 61 which includes an instruction that the reliability of the relative position or pose of second camera 11 is reduced is displayed on display screen 26. For example, information on an instruction that the standard deviation value of the estimated (calculated) three-dimensional coordinates is low and reliability is reduced, and an instruction that an observation object enters into the field of view without biasing to a specific location is included in warning message 61. Here, even in a case of being less than a time other than time t6, in the same manner it is determined that the reliability of the three-dimensional coordinates is reduced.

Figure 13A:
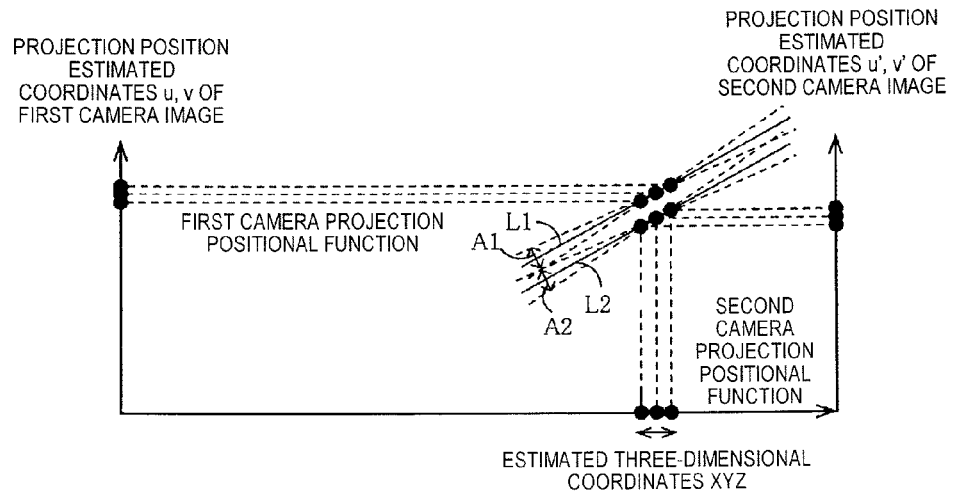
FIG. 13A is a schematic diagram illustrating an example of variation of three-dimensional coordinates in the second embodiment.
Figure 13B:
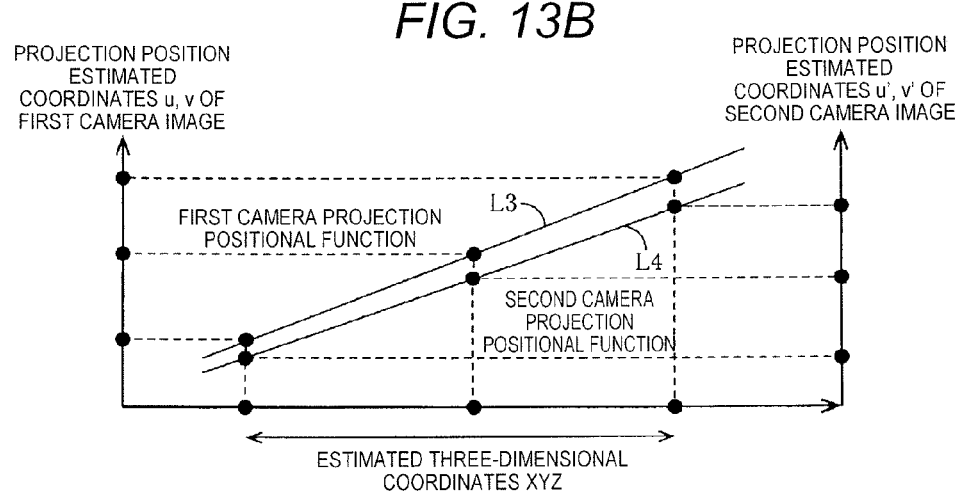
FIG. 13B is a schematic diagram illustrating an example of variation of three-dimensional coordinates in the second embodiment.

FIGS. 13A and 13B are schematic diagrams describing an example of variation of three-dimensional coordinates of the target points.

In FIGS. 13A and 13B, a sample (here three) of the estimated (calculated) three-dimensional coordinates (X, Y, Z) are indicated on a horizontal axis. A sample (here three) of two-dimensional coordinates (u, which are projected on first camera image 33 are indicated on a vertical axis on the left side from the target points as a sample which is indicated by three-dimensional coordinates. A sample (here three) of two-dimensional coordinates (u', v') which are projected on the second camera image 36 are indicated on a vertical axis on the right side from the target points as a sample which is indicated by three-dimensional coordinates.

The relationship between the two-dimensional coordinates (u, v) and the three-dimensional coordinates (X, Y, Z) satisfies a projection matrix equation (projection matrix function) which, for example, is indicated below as (Equation 3).

$$\lambda \begin{bmatrix} u \\ v \end{bmatrix} = K[I\ 0] \begin{bmatrix} X \\ Y \\ Z \\ 1 \end{bmatrix}, \qquad \text{(Equation 3)}$$

$$\lambda \begin{bmatrix} u' \\ v' \end{bmatrix} = K'[I\ 0] \begin{bmatrix} X' \\ Y' \\ Z' \\ 1 \end{bmatrix} = K'[R^T - R^T t] \begin{bmatrix} X \\ Y \\ Z \\ 1 \end{bmatrix}$$

In (Equation 3), K and K' indicate internal camera patterns. K is indicated by the matrix below, and K' is also indicated in the same manner.

$$K = \begin{bmatrix} \alpha & \gamma & u_0 \\ 0 & \beta & v_0 \\ 0 & 0 & 1 \end{bmatrix}$$

u0 and v0 are optical axis coordinates at an image plane (imaging surface) of first camera 10. α and β are focal distances of the x direction and the y direction. Ordinarily, α=β. γ is distortion of a coordinate axis on the image plane of the first camera 10, and ordinarily is 0.

As described above, in (Equation 3), R and t indicate the rotation matrix and the translation vector of the right camera (second camera 11) with respect to the coordinate system of the left camera (first camera 10).

The rotation matrix R is indicated by a product of each axis component of the rotation matrix R (R (θx), R (θy), R (θz)).

$$R = R(\theta x) \times R(\theta y) \times R(\theta z)$$

As described below, each axis component of the rotation matrix R (R (θx), R (θy), R (θz)) is expressed using a Euler angle.

$$R(\theta_x) = \begin{bmatrix} 1 & 0 & 0 \\ 0 & \cos\theta_x & -\sin\theta_x \\ 0 & \sin\theta_x & \cos\theta_x \end{bmatrix},$$

$$R(\theta_x) = \begin{bmatrix} \cos\theta_y & 0 & \sin\theta_y \\ 0 & 1 & 0 \\ -\sin\theta_y & 0 & \cos\theta_y \end{bmatrix}, R(\theta_z) = \begin{bmatrix} \cos\theta_z & -\sin\theta_z & 0 \\ \sin\theta_z & \cos\theta_z & 0 \\ \cos\theta_z & 0 & 1 \end{bmatrix}$$

As in FIG. 13A, in a case where standard deviation of the plurality of three-dimensional coordinates (XYZ coordinates) which are sequentially output from three-dimensional coordinates calculator 24 is small, the abnormality detection unit 25A determines that the reliability of the projection matrix equation (Equation 3) is low.

For example, in FIG. 13A, in a calculation process of the projection matrix equation (Equation 3), straight lines L1 and L2 which link between three samples are determined. However, in order to shorten the distance between each sample, there is a possibility to determine straight lines which have slightly different inclinations to L1 and L2 which are indicated by the solid line within the range of reference numerals A1 and A2.

Consequently, since the projection matrix equation (Equation 3) is changed, it is determined that the reliability of the projection matrix equation (Equation 3) is low. Accordingly, as a result, the abnormality detection unit 25A determines the reliability of the relative position or pose of second camera 11 to be low.

As in FIG. 13B, in a case where standard deviation of the three-dimensional coordinates (XYZ coordinates) which are output from three-dimensional coordinates calculator 24 is great, abnormality detection unit 25A determines that the reliability of the projection matrix equation (Equation 3) is high.

For example, in FIG. 13B, in the calculation process of the projection matrix equation (Equation 3), straight lines L3 and L4 which link between three samples are determined. In this case, since the distance between each sample is relatively long, L3 and L4 which are indicated by a solid line are uniquely determined.

Consequently, since the possibility that the projection matrix equation (Equation 3) is changed is low, it is determined that the reliability of the projection matrix equation (Equation 3) is high. Accordingly, as a result, abnormality detection unit 25A determines the reliability of the relative position or pose of second camera 11 to be high.

According to the stereo camera system of the present embodiment, for example, when first camera 10 and second camera 11 are installed, in a case where the standard deviation of the three-dimensional coordinates of each target point (each observation target point) which is included in first camera image 33 or second camera image 36 is low, the warning message is displayed. That is, in a case where each target point is not dispersed within the field of view (within the imaging range) of first camera 10 or second camera 11, the reliability of the relative position or pose of second camera 11 being low is displayed by the warning message.

Thereby, for example, it is possible to install the camera while adjusting the position or the orientation of first camera 10 and second camera 11 such that the camera installer (user) disperses the observation object within the field of view of the camera. Thereby, it is possible to improve reliability of the three-dimensional coordinates which are calculated by three-dimensional coordinates calculator 24.

Here, server device 20A may induce the user such that first camera 10 and second camera 11 are installed in a state in which, for example, the number of feature points and the number of matching pairs are great such that the warning message which is indicated in the first embodiment is not generated. For example, in a case where the number of feature points and the number of matching pairs is less than the predetermined criterion, the warning message is displayed in the same manner to the first embodiment.

Here, in the present embodiment, server device 20A performs each process described above, and the camera installer is assumed to receive instruction from the manager of server device 20A, but the camera installer has tablet terminal 40, and is also able to operate while viewing the screen. That is, tablet terminal 40 is able to determine the process described above using tablet terminal 40 by having an image processing function in the same manner as server device 20A. By using tablet terminal 40, when the camera installer installs first camera 10 and second camera 11, installation work is possible while confirming that the reliability of the three-dimensional coordinates is high. Accordingly, it is possible to install the position or pose of first camera 10 and second camera 11 in a designated state, and it is possible to suppress positional deviation during initial installation.

Although various embodiments are described above while referring to the drawings, needless to say, the present embodiment is not limited to the examples. According to a person skilled in the art, within the scope which is set forth in the claims, it is obvious that it is possible to conceive of various modified examples and correction examples, and therein is naturally understood as belonging to the technical scope of the present invention.

In the embodiments, display screen 26 exemplifies displaying various warning information, but warning information may be presented by other methods. For example, a warning sound may be output using a speaker which is not shown in the drawings, and vibration may be generated which indicates a warning using a vibration unit which is not shown in the drawings.

In the embodiments above, it is exemplified that the three-dimensional coordinates are calculated (calculated, computed), but three-dimensional coordinates may be derived by other methods. For example, server devices 20 and 20A may hold a table which indicates a relationship between each parameter which is necessary for deriving the three-dimensional coordinates, and three-dimensional coordinates, and the three-dimensional coordinates may be derived with reference to the table.

(Summary of One Aspect of the Present Invention)

The information presentation device of one aspect of the present invention has an image acquisition unit, a parameter deriving unit, an abnormality detection unit, and a presentation unit. The image acquisition unit acquires a first image which is captured by a first imaging device and a second image which is captured by a second imaging device. The parameter deriving unit sequentially derives parameters for deriving three-dimensional coordinates from the first image and the second image. The abnormality detection unit determines presence or absence of an abnormality in a relative positional relationship between the first imaging device and the second imaging device according to the sequentially derived parameters. In a case where an abnormality is determined, the presentation unit presents warning information including an instruction that there is an abnormality.

According to this configuration, the user is able to easily recognize a positional relationship (calibration) abnormality relative between imaging devices, and is able to cope early with the calibration abnormality of the imaging device.

In the information presentation device of an aspect of the present invention, the parameter deriving unit has a feature point extractor which sequentially derives feature points which are included in the first image and the second image, and the abnormality detection unit determines presence or absence of an abnormality based on the number of sequentially derived feature points.

According to this configuration, the user is able to estimate that the imaging range is changed, and is able to easily recognize the calibration abnormality of the imaging device from change in the number of feature points of the first image and the second image.

In the information presentation device of an aspect of the present invention, the parameter deriving unit has a matching pair detector which sequentially detects matching points which match the feature points that are included in the first image and feature points which are included in the second image, and the abnormality detection unit determines presence or absence of an abnormality based on the number of sequentially determined matching points.

According to this configuration, the user is able to estimate that the imaging range is changed, and is able to easily recognize the calibration abnormality of the imaging device from change in the number of matching points common to the feature points of the first image and the second image.

In the information presentation device of an aspect of the present invention, the parameter deriving unit has an estimation unit which sequentially estimates at least one of the position and pose of the second imaging device with respect to the first imaging device based on the matching points. The abnormality detection unit determines presence or absence of an abnormality based on change of at least one of the sequentially estimated position and pose.

According to this configuration, the user is able to estimate that the imaging range is changed, and is able to easily recognize the calibration abnormality of the imaging device from the change in at least one of the position and pose of the imaging device.

The information presentation device of an aspect of the present invention has a three-dimensional coordinate derivation unit which sequentially derives the three-dimensional coordinates of the target points in which feature points of the first image that are included in the matching points are reverse projected based on the sequentially derived parameters. In a case where the variation of the three-dimensional coordinates of the sequentially derived target points are equal to or less than a predetermined value, the presentation unit presents the warning information which includes the instruction that the reliability of the estimation result of the position and pose of the second imaging device with respect to the first imaging device is low.

According to this configuration, the user is able to easily recognize the instruction that the reliability of the three-dimensional coordinates is low. Accordingly, for example, when the installer of the imaging device installs the imaging device, it is possible to easily install the imaging device with a designated positional relationship, and it is possible to improve work effectiveness during installation by carrying out installation work while referencing the warning information.

In an information presentation device of an aspect of the present invention, the warning information includes information on the coping method according to the cause of the abnormality.

According to this configuration, the user is able to easily confirm the coping method fitting the cause of the configuration abnormality, and is able to cope early with the calibration abnormality.

The stereo camera system of an aspect of the present invention is a stereo camera system in which the first imaging device, the second imaging device, and the information presentation device are connected via a network. The first imaging device is fixed using a first chassis, and the second imaging device is fixed using a second chassis. The information presentation device has an image acquisition unit, a parameter deriving unit, an abnormality detection unit, and the presentation unit. The image acquisition unit acquires the first image which is captured by the first imaging device and the second image which is captured by the second imaging device via the network. The parameter deriving unit sequentially derives parameters for deriving three-dimensional coordinates from the first image and the second image. The abnormality detection unit determines presence or absence of an abnormality in a relative positional relationship between the first imaging device and the second imaging device according to the sequentially derived parameters. In a case where an abnormality is determined, the presentation unit presents warning information including an instruction that there is an abnormality.

According to this configuration, the user is able to easily recognize a positional relationship (calibration) abnormality relative between imaging devices, and is able to cope early with the calibration abnormality of the imaging device. In addition, it is possible to improve a degree of freedom of the disposition of each imaging device by fixing the first imaging device and the second imaging device in separate chassis. Accordingly, it is possible to easily make a positional relationship which is relative between imaging devices in a designated state, and it is possible to derive the three-dimensional coordinates in various locations.

An information presentation method of an aspect of the present invention includes acquiring a first image which is captured by a first imaging device and a second image which is captured by a second imaging device, sequentially deriving parameters for deriving three-dimensional coordinates from the first image and the second image, determining presence or absence of an abnormality in a relative positional relationship between the first imaging device and the second imaging device according to the sequentially derived parameters, and presenting warning information including an instruction in which there is an abnormality using the presentation unit in a case where an abnormality is determined.

According to this method, the user is able to easily recognize a positional relationship (calibration) abnormality relative between imaging devices, and is able to cope early with the calibration abnormality of the imaging device.

What is claimed is:

1. An information presentation device comprising a processor that, when executing instructions stored in a memory, performs operations comprising:
   acquiring, at predetermined intervals, a first image captured by a first imaging device and a second image captured by a second imaging device, the first imaging device mounted in a first chassis and the second imaging device mounted in a second chassis which is distinct from the first chassis, such that the first imaging device and the second imaging device are movable independently and separately from one another, wherein the first imaging device and second imaging device comprise a stereo camera which recovers three-dimensional position information based on the first image and the second image;
   extracting, at the predetermined intervals, feature points from the first image and the second image;
   obtaining, at the predetermined intervals, a parameter value based on the extracted feature points;
   determining, at the predetermined intervals, a change between the currently obtained parameter value and the previously obtained parameter value;
   determining, at the predetermined intervals, whether or not an abnormality is present in a relative positional relationship or a relative relationship of orientation between the first imaging device and the second imaging device according to the determined change in the parameter value; and
   presenting warning information including an instruction that there is an abnormality to correct at least one of the position and orientation of one of the first imaging device and the second imaging device by physically moving at least one of the first imaging device and the second imaging device, when it is determined that the abnormality is present,
   wherein, in the presenting, a plurality of parameter values obtained at the predetermined intervals are displayed to be arranged along a time axis, together with a predetermined threshold.

2. The information presentation device according to claim 1,
   wherein the parameter value is obtained by counting a number of the extracted feature points, and
   it is determined whether or not an abnormality is present based on the counted number of extracted feature points.

3. The information presentation device according to claim 1,
   wherein the parameter value is obtained by detecting matching points that match at least one feature point, of the extracted feature points, which is included in the first image and at least one feature point, of the extracted feature points, which is included in the second image,
   it is determined whether or not the abnormality is present based on a number of detected matching points.

4. The information presentation device according to claim 1,
   wherein, in determining the parameter value, the processor further performs operations comprising:
   detecting matching points that match a plurality of first feature points, of the extracted feature points, which are included in the first image and a plurality of second feature points, of the extracted feature points, which are included in the second image; and
   estimating at least one of a position and an orientation of the second imaging device with respect to the first imaging device based on the detected matching points,
   wherein it is determined that the abnormality is present based on a change in at least one of the estimated position and the orientation of the second imaging device with respect to the first imaging device.

5. The information presentation device according to claim 1,
   wherein the warning information includes information on a coping method according to a cause of the abnormality.

6. An information presentation device comprising a processor, executing instructions stored in a memory performs operations comprising:
   acquiring a first image captured by a first imaging device and a second image captured by a second imaging device, the first imaging device mounted in a first chassis and the second imaging device mounted in a second chassis which is distinct from the first chassis, such that the first imaging device and the second imaging device are movable independently and separately from one another, wherein the first imaging device and second imaging device comprise a stereo camera which recovers three-dimensional position information based on the first image and the second image;

extracting feature points from the first image and the second image;

detecting matching points that match a plurality of first feature points, of the extracted feature points, which are included in the first image and a plurality of second feature points, of the extracted feature points, which are included in the second image;

estimating at least one of a position and an orientation of the second imaging device with respect to the first imaging device based on the detected matching points;

determining whether or not an abnormality is present in a relative positional relationship or a relative relationship of orientation between the first imaging device and the second imaging device based on a change in at least one of the estimated position and the orientation of the second imaging device with respect to the first imaging device;

presenting warning information including an instruction that there is an abnormality to correct at least one of the position and orientation of one of the first imaging device and the second imaging device by physically moving at least one of the first imaging device and the second imaging device, when it is determined that the abnormality is present;

determining three-dimensional coordinates of target points, which are obtained by reverse projecting two dimensional coordinates of the plurality of first feature points in the first image that are included in the detected matching points; and determining whether or not a variation in the determined three-dimensional coordinates of the target points is equal to or less than a predetermined value, wherein, in the presenting, information indicating that reliability of the estimated position and the orientation of the second imaging device with respect to the first imaging device is low, when it is determined that the variation is equal to or less than the predetermined value.

7. The information presentation device according to claim 6, wherein the variation in the determined three-dimensional coordinates of the target points being one of a standard deviation or a dispersion.

8. A stereo camera system comprising:
a first imaging device that captures a first image and is fixed to a first chassis, and
a second imaging device that captures a second image and is fixed to a second chassis which is distinct from the first chassis, such that the first imaging device and the second imaging device are movable independently and separately from one another, wherein the first imaging device and second imaging device comprise a stereo camera which recovers three-dimensional position information based on the first image and the second image;
an information presentation device that is connected to the first imaging device and the second imaging device via a network, and comprises a processor that, when executing instructions stored in a memory, performs operations comprising:
acquiring, at predetermined intervals, the first image captured by the first imaging device and the second image captured by the second imaging device via the network;
extracting, at the predetermined intervals, feature points from the first image and the second image;
obtaining, at the predetermined intervals, a parameter value based on the extracted feature points;
determining, at the predetermined intervals, a change between the currently obtained parameter value and the previously obtained parameter value;
determining, at the predetermined intervals, whether or not an abnormality is present in a relative positional relationship or a relative relationship of orientation between the first imaging device and the second imaging device according to the determined change in the parameter value, and
presenting warning information including an instruction that there is the abnormality to correct at least one of the position and orientation of one of the first imaging device and the second imaging device by physically moving at least one of the first imaging device and the second imaging device, when it is determined that the abnormality is present,
wherein, in the presenting, a plurality of parameter values obtained at the predetermined intervals are displayed to be arranged along a time axis, together with a predetermined threshold.

9. An information presentation method comprising:
acquiring, at predetermined intervals, a first image captured by a first imaging device and a second image captured by a second imaging device, the first imaging device mounted in a first chassis and the second imaging device mounted in a second chassis which is distinct from the first chassis, such that the first imaging device and the second imaging device are movable independently and separately from one another, wherein the first imaging device and second imaging device comprise a stereo camera which recovers three-dimensional position information based on the first image and the second image;
extracting, at the predetermined intervals, feature points from the first image and the second image;
obtaining, at the predetermined intervals, a parameter value based on the extracted feature points;
determining, at the predetermined intervals, a change between the currently obtained parameter value and the previously obtained parameter value;
determining, at the predetermined intervals, whether or not an abnormality is present in a relative positional relationship or a relative relationship of orientation between the first imaging device and the second imaging device according to the determined change in the parameter value; and
presenting warning information including an instruction that there is the abnormality to correct at least one of the position and orientation of one of the first imaging device and the second imaging device by physically moving at least one of the first imaging device and the second imaging device, when it is determined that the abnormality is present,
wherein, in the presenting, a plurality of parameter values obtained at the predetermined intervals are displayed to be arranged along a time axis, together with a predetermined threshold.

10. A stereo camera system comprising:
a first imaging device that captures a first image and is fixed to a first chassis, and
a second imaging device that captures a second image and is fixed to a second chassis which is distinct from the first chassis, such that the first imaging device and the second imaging device are movable independently and separately from one another, wherein the first imaging device and second imaging device comprise a stereo camera which recovers three-dimensional position information based on the first image and the second image;
an information presentation device that is connected to the first imaging device and the second imaging device via a network, and comprises a processor that, when executing instructions stored in a memory, performs operations comprising:
acquiring, the first image captured by the first imaging device and the second image captured by the second imaging device via the network;
extracting feature points from the first image and the second image;
detecting matching points that match a plurality of first feature points, of the extracted feature points, which are included in the first image and a plurality of second feature points, of the extracted feature points, which are included in the second image;
estimating at least one of a position and an orientation of the second imaging device with respect to the first imaging device based on the detected matching points,
determining whether or not an abnormality is present in a relative positional relationship or a relative relationship of orientation between the first imaging device and the second imaging device based on a change in at least one of the estimated position and the orientation of the second imaging device with respect to the first imaging device;
presenting warning information including an instruction that there is an abnormality to correct at least one of the position and orientation of one of the first imaging device and the second imaging device by physically moving at least one of the first imaging device and the second imaging device, when it is determined that the abnormality is present;
determining three-dimensional coordinates of target points, which are obtained by reverse projecting two dimensional coordinates of the plurality of first feature points in the first image that are included in the detected matching points; and
determining whether or not a variation in the determined three-dimensional coordinates of the target points is equal to or less than a predetermined value,
wherein, in the presenting, information indicating that reliability of the estimated position and the orientation of the second imaging device with respect to the first imaging device is low, when it is determined that the variation is equal to or less than the predetermined value.

11. An information presentation method comprising:
acquiring a first image captured by a first imaging device and a second image captured by a second imaging device, the first imaging device mounted in a first chassis and the second imaging device mounted in a second chassis which is distinct from the first chassis, such that the first imaging device and the second imaging device are movable independently and separately from one another, wherein the first imaging device and second imaging device comprise a stereo camera which recovers three-dimensional position information based on the first image and the second image;
extracting feature points from the first image and the second image;
detecting matching points that match a plurality of first feature points, of the extracted feature points, which are included in the first image and a plurality of second feature points, of the extracted feature points, which are included in the second image;
estimating at least one of a position and an orientation of the second imaging device with respect to the first imaging device based on the detected matching points;
determining whether or not an abnormality is present in a relative positional relationship or a relative relationship of orientation between the first imaging device and the second imaging device based on a change in at least one of the estimated position and the orientation of the second imaging device with respect to the first imaging device;
presenting warning information including an instruction that there is an abnormality to correct at least one of the position and orientation of one of the first imaging device and the second imaging device by physically moving at least one of the first imaging device and the second imaging device, when it is determined that the abnormality is present;
determining three-dimensional coordinates of target points, which are obtained by reverse projecting two dimensional coordinates of the plurality of first feature points in the first image that are included in the detected matching points; and
determining whether or not a variation in the determined three-dimensional coordinates of the target points is equal to or less than a predetermined value,
in the presenting, information indicating that reliability of the estimated position and the orientation of the second imaging device with respect to the first imaging device is low, when it is determined that the variation is equal to or less than the predetermined value.

* * * * *